US008738265B2

(12) United States Patent
Jonassson

(10) Patent No.: US 8,738,265 B2
(45) Date of Patent: May 27, 2014

(54) STABILITY CONTROL METHOD AND SYSTEM FOR USE WHEN DRIVING ON A LOW-µ SURFACE

(75) Inventor: Mats Jonassson, Partille (SE)

(73) Assignee: Volvo Car Corporation, Gothenburg (SE)

( * ) Notice: Subject to any disclaimer, the term of this patent is extended or adjusted under 35 U.S.C. 154(b) by 51 days.

(21) Appl. No.: 13/593,082

(22) Filed: Aug. 23, 2012

(65) Prior Publication Data
US 2013/0245908 A1   Sep. 19, 2013

(30) Foreign Application Priority Data
Aug. 25, 2011   (EP) .................................. 11178817

(51) Int. Cl.
B60T 8/24   (2006.01)
(52) U.S. Cl.
USPC ............................................................ 701/72
(58) Field of Classification Search
None
See application file for complete search history.

(56) References Cited

U.S. PATENT DOCUMENTS

| 6,918,638 | B2 | 7/2005 | Schneider et al. |
| 7,214,166 | B2 | 5/2007 | Steen et al. |
| 2008/0172153 | A1* | 7/2008 | Ozaki et al. ...................... 701/36 |
| 2009/0260901 | A1* | 10/2009 | Ishii et al. ...................... 180/6.5 |
| 2011/0196579 | A1* | 8/2011 | Tokimasa et al. ............... 701/48 |
| 2013/0179004 | A1* | 7/2013 | Nihei et al. ....................... 701/1 |

* cited by examiner

Primary Examiner — Thomas Tarcza
Assistant Examiner — Adam Alharbi
(74) Attorney, Agent, or Firm — Brooks Kushman P.C.

(57) ABSTRACT

A system and a method for assisting a driver of a vehicle to turn the vehicle when driving during low-mu surface conditions. The vehicle has a steering system, a plurality of wheels and a brake system allowing individual braking of the respective wheels of the vehicle. The system comprises a controller arranged to detect if the vehicle accelerates after the brakes of the vehicle have been applied, and detect a driver command to turn the vehicle in either direction. If both detections are positive the controller is further arranged to release the brake force on a side of the vehicle opposite to the detected turning command direction.

9 Claims, 3 Drawing Sheets

STABILITY CONTROL METHOD AND SYSTEM FOR USE WHEN DRIVING ON A LOW-μ SURFACE

CROSS-REFERENCE TO RELATED APPLICATIONS

This application claims foreign priority benefits under 35 U.S.C. §119(a)-(d) to EP 11178817.0 filed Aug. 25, 2011, which is hereby incorporated by reference in its entirety.

TECHNICAL FIELD

The invention relates to anti-skid braking systems and electronic stability control systems for wheeled vehicles, and more specifically to a method and system for improving vehicle control when driving during on a low-mu surface.

BACKGROUND

During vehicle travel on roads having a very low coefficient-of-friction (commonly denoted by μ or mu) conditions, where the mu value may be below 0.1, it is likely that prior art anti-skid vehicle control systems will be unable to provide sufficient assistance if the vehicle starts to skid. Thus, there is an increased risk of the vehicle departing from the road or desired lane of travel. Such low-mu conditions may occur when so-called glare ice or black ice has formed on the road surface.

One situation when this may occur is during downhill travel on a low-mu surface. Even if the brakes of the vehicle are fully applied, the vehicle will not decelerate as the low-mu surface will provide no or very limited traction. The friction between the road and vehicle tires may most likely be unable to hold the vehicle on the surface due to the road gradient.

Today's anti-skid control systems generally attempt to stabilize a vehicle which start to skid on the low-mu surface by applying individual brake actuations in order to increase longitudinal tire forces on the braked wheel/wheels. This will, however, be of limited use when the driver commands full braking.

Conventional vehicle controllers, e.g. so called Electronic Stability Controllers (ESC), attempt to assist a driver during turning by applying the brakes at one or more wheels of the vehicle. If the driver brakes hard and the conventional ESC intervenes to stabilize the vehicle, the vehicle may not turn since all wheels are braked to the point that all tire forces are saturated.

Thus, a brake intervention from a conventional anti-skid control system when travelling on a low-mu surface road may fail to bring the vehicle back to the originally travelled lane once the vehicle starts to skid.

During vehicle travel on roads having a very low coefficient-of-friction (commonly denoted by μ or mu) conditions, where the mu value may be below 0.1, it is likely that prior art anti-skid vehicle control systems will be unable to provide sufficient assistance if the vehicle starts to skid. Thus, there is an increased risk of the vehicle departing from the road or desired lane of travel. Such low-mu conditions may occur when so-called glare ice or black ice has formed on the road surface.

One situation when this may occur is during downhill travel on a low-mu surface. Even if the brakes of the vehicle are fully applied, the vehicle will not decelerate as the low-mu surface will provide no or very limited traction. The friction between the road and vehicle tires may most likely be unable to hold the vehicle on the surface due to the road gradient.

Today's anti-skid control systems generally attempt to stabilize a vehicle which start to skid on the low-mu surface by applying individual brake actuations in order to increase longitudinal tire forces on the braked wheel/wheels. This will, however, be of limited use when the driver commands full braking.

Conventional vehicle controllers, e.g. so called Electronic Stability Controllers (ESC), attempt to assist a driver during turning by applying the brakes at one or more wheels of the vehicle. If the driver brakes hard and the conventional ESC intervenes to stabilize the vehicle, the vehicle may not turn since all wheels are braked to the point that all tire forces are saturated.

Thus, a brake intervention from a conventional anti-skid control system when travelling on a low-mu surface road may fail to bring the vehicle back to the originally travelled lane once the vehicle starts to skid.

SUMMARY

In a disclosed embodiment, a stability control system for a vehicle having a steering system, a plurality of wheels and a brake system is operative to detect forward acceleration of the vehicle after the brakes are applied, and detect a driver command to turn the vehicle in a desired direction. In response to the above two conditions, the controller commands a reduction in brake force applied to wheels on a side of the vehicle opposite from the desired direction, thereby preventing the vehicle from skidding in yaw.

The stability system may further compare a vehicle velocity with a predetermined velocity threshold and apply braking in different manners depending on the comparison. If the vehicle velocity is above the threshold, braking is applied in a first manner to optimize velocity reduction, while if the vehicle velocity is below the threshold braking is applied in a second manner to optimize vehicle control.

In another disclosed embodiment, a vehicle stability control method comprises detecting a vehicle brake application, detecting a forward acceleration of the vehicle after the brake application, and detecting a driver command to turn the vehicle in a desired direction. Braking force is then reduced on at least one wheel on a side of the vehicle opposite from the desired direction to allow the driver to maintain proper yaw control of the vehicle.

In another disclosed embodiment, a stability control method for a vehicle comprises detecting a vehicle brake application, and detecting a forward acceleration of the vehicle after the brake application. It is then inferred from those two detected conditions that the vehicle is driving on a surface having a low coefficient-of-friction and a downhill gradient. Braking interventions may then be made as necessary to allow the driver to maintain proper yaw control of the vehicle.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The system comprises a controller operative to detect if the vehicle accelerates in the vehicle direction of travel after the brakes of the vehicle are applied. The controller is further operative to detect a command to turn the vehicle in a desired direction. If the two above-stated conditions are met (i.e., the vehicle has accelerated after brake application, and a command to turn has been made) the controller is further operative to release the brake force on a side of the vehicle opposite to the desired direction of the turning command.

The controller may further operative to detect if the vehicle velocity is below a predetermined velocity threshold. Such a vehicle velocity threshold discrimination enables a differentiation between high-speed requirements, where a reduction of speed may be of highest priority, and low-speed requirements, e.g. when driving slowly on low-mu surface, where the ability to control the vehicle through turning may be of higher priority than a limited reduction of speed. If the vehicle velocity is below the velocity threshold braking force is applied in a manner to optimize vehicle control, and if the vehicle velocity is above the velocity threshold braking force is applied in a manner to optimize velocity reduction.

Detection of vehicle acceleration after the brakes have been applied may also be used to estimate or detect a low-mu road surface and to estimate or detect a downhill road gradient. A "low-mu" surface, in this context, may be defined as one having a mu value so low that braking is not effective.

Detecting if the vehicle accelerates after the brakes of the vehicle have been applied may be accomplished by using sensors such as wheel speed sensors and vehicle accelerometers. Such sensors are already present on most modern vehicles for use in existing safety and stability control systems, so that the disclosed novel method may be provided with no or little additional hardware cost.

Figure 1A:
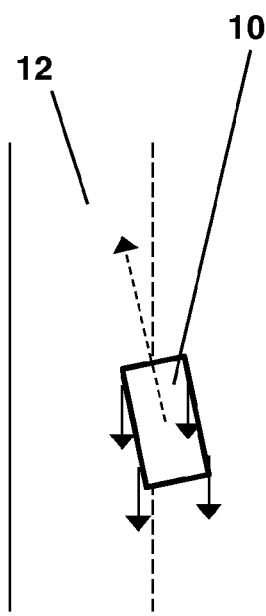
FIGS. 1a, 1b and 1c are schematic illustrations of a vehicle travelling on a low-mu surface.
Figure 1B:
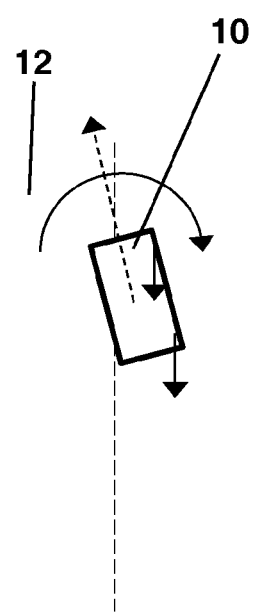
Figure 1C:
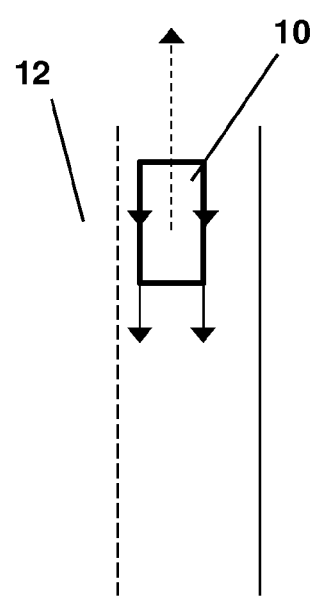

FIGS. 1a-c schematically illustrate a vehicle 10 running downhill on a low-mu surface road 12, i.e. in the general direction of the dashed arrow (toward the top of the page). The solid-line straight arrows represent tire forces applied to the vehicle 10 by each of the four tires when brakes are applied.

In FIG. 1a, the driver has applied the brakes of the vehicle 10 in an attempt to stop or slow the vehicle (as indicated by the brake force arrows acting opposite the direction of vehicle velocity). Stopping or slowing may not be possible if the available tire/road friction is insufficient to hold the vehicle on the road surface having a low coefficient of friction ($\mu$). This condition may be express in the equation:

$$m \times g \times \sin(\text{road gradient}) > m \times g \times \mu$$

where m=mass of the vehicle;
g=acceleration due to gravity; and
$\mu$=tire/road coefficient of friction.

Under these conditions, the vehicle may continue to travel downhill even with the brakes fully actuated. The vehicle 10 may also begin to skid in yaw and head towards the opposite lane. The driver of the vehicle 10 may steer to the right in an attempt to correct the vehicle back to the desired lane of travel (the right lane), but this may have very limited or no effect because of the low-mu conditions. Moreover, a brake intervention from a conventional stability/anti-skid control system may not be able to bring the vehicle back to the desired lane of travel. In particular, this may be the case if the stability/anti-skid control system is activated at the same time as an Anti-Lock Brake System (ABS) is engaged on all wheels of the vehicle.

In FIG. 1b the controller, in order to bring the vehicle back to the desired lane of travel, reduces the braking forces applied to at least one of the wheels on the side of the vehicle opposite to the desired turning direction as commanded by the driver of the vehicle, the left hand side of the vehicle in this example.

In order to enable this functionality, friction between the road 12 and the wheels of the vehicle 10 as well as a road gradient downhill may be detected. Although the functionality, in other embodiments, may be enabled when there is no road gradient downhill, the combination of low friction and a road gradient downhill is likely to give the vehicle a considerable or infinite stopping distance. This means that the risk of hitting an obstacle will increase significantly during low friction when travelling downhill as compared to the same situation when travelling on an essentially flat road. Enabling of this functionality may be done by the controller using information from wheel speed sensors and vehicle accelerometers. In essence, this functionality is enabled if the vehicle accelerates even as full braking is applied to all wheels thereof.

Through reducing the brake forces applied to the wheel(s) on the left hand side of the vehicle, as illustrated in FIG. 1b, a yaw moment, as illustrated by the curved arrow, is generated due to the resulting imbalance of longitudinal tire forces on the left hand side and right hand side of the vehicle. This differs from a conventional anti-skid control system which will never cancel brake forces. Thus, the yaw moment will be generated by reducing wheel brake forces rather than adding brake forces, as is the case for a conventional stability/anti-skid intervention.

The yaw moment thus generated, as illustrated by the curved solid arrow in FIG. 1b, acts to turn the vehicle back to the desired (right) lane, as illustrated in FIG. 1c. At this stage the functionality may be terminated and all the wheels of the vehicle may be partially or fully braked once more.

Figure 2:
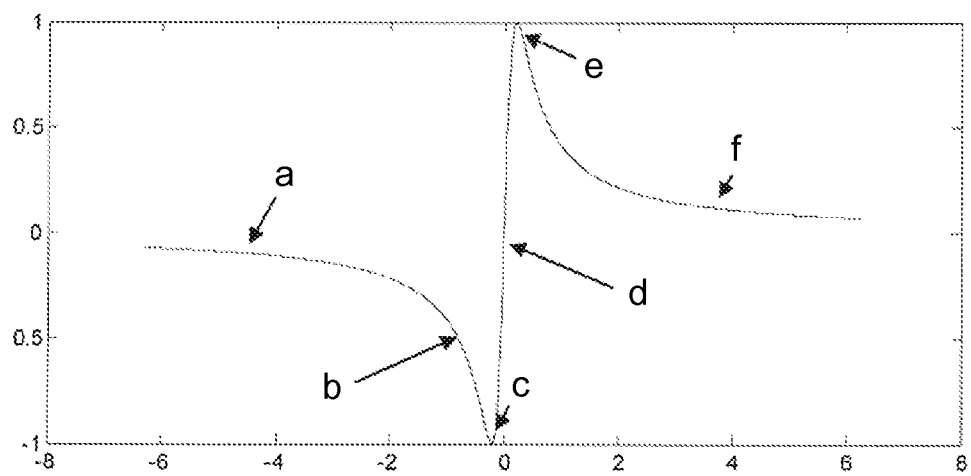
FIG. 2 is a schematic diagram illustrating how tire forces are controlled through braking, spinning and free rolling.

FIG. 2 shows the conceptual force generation from a tire. The y-axis represents the longitudinal force, which is normalized such that 1 corresponds to a maximum longitudinal force. The x-axis represents the longitudinal slip, where 0 corresponds to free rolling and −1 to a locked wheel. Wheel spinning means that longitudinal slips are far outside the linear region of the tire characteristics, typically less than −2 or higher than 2.

In FIG. 2, curve a corresponds to the wheel spinning backwards, curve b corresponds to the wheel being braked to be locked, curve c corresponds to maximum braking force during ABS braking, curve d corresponds to a free rolling wheel, curve e corresponds to maximum traction force, and curve f corresponds to the wheel spinning forwards.

From FIG. 2 it is clear that the longitudinal force is significantly smaller when the wheel spins compared to a free rolling or locked wheel.

Figure 3:
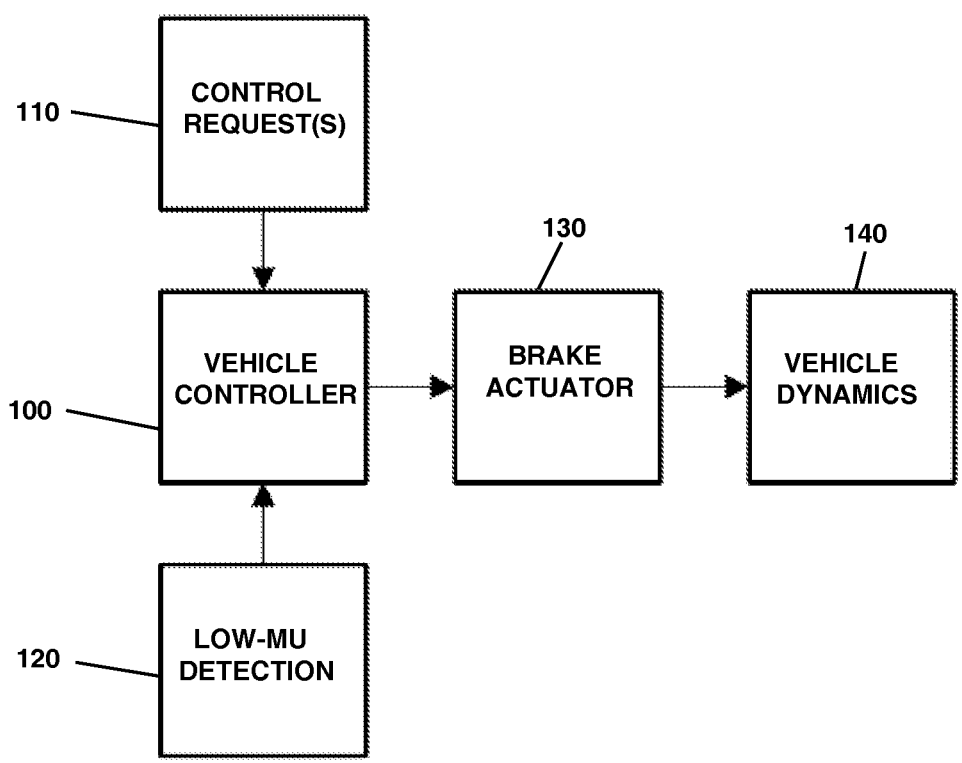
FIG. 3 is a schematic block diagram illustrating the interaction between the control requests, the controller and the low-mu surface detection and how these are connected to the brake actuator for affecting the vehicle dynamics.

FIG. 3 illustrates schematically a vehicle control module 100 receiving control requests 110 which may include braking and/or steering inputs from the driver. Vehicle control module 100 further receives inputs from a low-mu detection module and/or system 120, which may utilize (as discussed above) inputs indicating wheel speeds and vehicle acceleration. Vehicle control module 100 reduces or cancels brake forces at the appropriate wheel(s) via the brake actuator 130 when necessary to controlling the vehicle dynamics 140, as described above.

The disclosed method may also comprise assisting a driver of a vehicle to turn the vehicle in a desired direction when driving during low-mu surface conditions. The method comprises the steps of: detecting if the vehicle accelerates after the brakes of the vehicle have been applied; and detecting a driver command to turn the vehicle in a desired direction. If those two conditions are met, braking force is at least partially reduced on a side of the vehicle opposite the turning command direction.

The method may further comprise the steps of: detecting low friction between the road and the wheels of the vehicle; and detecting a downhill road gradient.

The low friction between the road and the wheels of the vehicle and detection of the road gradient downhill may be accomplished using wheel speed sensors and vehicle accelerometers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A stability control system for a vehicle having a steering system, a plurality of wheels and a brake system, the system operative to:
   detect forward acceleration of the vehicle after the brakes are applied; detect a driver command to turn the vehicle in a desired direction;
   in response to the above two conditions, reduce brake force applied to wheels on a side of the vehicle opposite from the desired direction;
   compare a vehicle velocity with a predetermined velocity threshold;
   apply braking in a first manner to optimize velocity reduction if the vehicle velocity is above the threshold; and
   apply braking in a second manner to optimize vehicle control if the vehicle velocity is below the threshold.

2. The system of claim 1 wherein the controller is further operative to use the detected forward acceleration to determine a low coefficient-of-friction between a road surface and the wheels of the vehicle.

3. The system of claim 1 wherein the controller is further to use the detected forward acceleration to determine a downhill road gradient.

4. The system of claim 1 comprising wheel speed sensors and a vehicle accelerometer sending signals to the controller, the controller using the signals to detect the forward acceleration after the brakes are applied.

5. A vehicle stability control method comprising:
   detecting a vehicle brake application; detecting a forward acceleration of the vehicle after the brake application; detecting a driver command to turn the vehicle in a desired direction;
   reducing braking force on a wheel on a side of the vehicle opposite from the desired direction
   comparing a vehicle velocity with a predetermined velocity threshold;
   applying braking in a first manner to optimize velocity reduction if the vehicle velocity is
   above the threshold; and
   applying braking force in a second manner to optimize vehicle control if the vehicle velocity is below the threshold.

6. The method of claim 5 further comprising using the detected forward acceleration to determine a low coefficient-of-friction between a road surface and wheels of the vehicle.

7. The method of claim 5 further comprising using the detected forward acceleration to determine a downhill road gradient.

8. A stability control method for a vehicle comprising:
   detecting a vehicle brake application;
   detecting a forward acceleration of the vehicle after the brake application;
   inferring from the above two detected conditions that the vehicle is driving on a surface having a low coefficient-of-friction and a downhill gradient;
   comparing a vehicle velocity with a predetermined velocity threshold;
   applying braking in a first manner to optimize velocity reduction if the vehicle velocity is above the threshold; and
   applying braking force in a second manner to optimize vehicle control if the vehicle velocity is below the threshold.

9. The method of claim 8 further comprising:
   detecting a driver command to turn the vehicle in a desired direction; and
   reducing braking force on a wheel on a side of the vehicle opposite from the desired direction.

* * * * *